(12) United States Patent
Jang et al.

(10) Patent No.: US 7,372,866 B2
(45) Date of Patent: May 13, 2008

(54) WIRELESS COMMUNICATION METHOD FOR AVOIDING MUTUAL INTERFERENCE BETWEEN WIRELESS COMMUNICATION SYSTEMS, AND APPARATUS THEREOF

(75) Inventors: Kyung-Hun Jang, Suwon (KR);
Jong-hun Park, Seoul (KR); Bin Zhen, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 968 days.

(21) Appl. No.: 10/098,376

(22) Filed: Mar. 18, 2002

(65) Prior Publication Data

US 2002/0167931 A1 Nov. 14, 2002

(30) Foreign Application Priority Data

May 12, 2001 (KR) .............................. 2001-26019

(51) Int. Cl.
*H04J 3/16* (2006.01)
(52) U.S. Cl. ..................................... 370/437; 455/450
(58) Field of Classification Search ..................... None
See application file for complete search history.

(56) References Cited

U.S. PATENT DOCUMENTS

| 5,323,447 | A | | 6/1994 | Gillis et al. | |
|---|---|---|---|---|---|
| 5,907,812 | A | * | 5/1999 | Van De Berg | 455/461 |
| 6,351,643 | B1 | * | 2/2002 | Haartsen | 455/450 |
| 6,470,006 | B1 | * | 10/2002 | Moulsley | 370/347 |
| 6,570,861 | B1 | * | 5/2003 | Marsan et al. | 370/330 |
| 6,574,456 | B2 | * | 6/2003 | Hamabe | 370/331 |
| 2001/0016499 | A1 | * | 8/2001 | Hamabe | 455/454 |
| 2005/0286467 | A1 | * | 12/2005 | Chang et al. | 370/330 |

FOREIGN PATENT DOCUMENTS

| EP | 0 716 514 A1 | 6/1996 |
|---|---|---|
| EP | 0 884 858 A2 | 12/1998 |

(Continued)

OTHER PUBLICATIONS

Japanese Abstract No. 8-331045, dated Dec. 13, 1996.
Gerard Cervello, et al., "Dynamic Channel Selection (DCS) Scheme for 802.11", IEEE 802.11-00/195, XX, XX, Jul. 12, 2000, pp. 1-7, XP002213585.

(Continued)

*Primary Examiner*—Anh-Vu Ly
(74) *Attorney, Agent, or Firm*—Sughrue Mion, PLLC (57) ABSTRACT

The present invention discloses an apparatus and method for avoiding mutual interference between wireless communication systems. A measurement unit measures the strength of a signal received through a channel to be used in a transmission slot for a switching time of a reception mode and a transmission mode. A judgment unit compares the strength of the received signal with the strength of a reference signal, and judges data transmission. A control unit outputs a signal for performing a transmission operation of the data according to the judgment of the judgment unit. The wireless communication system transmits the data according to the input signal from the control unit. The data transmission is decided by confirming the state of the transmission slot, thereby avoiding collision with a communication apparatus using a frequency identical to a frequency of the channel of the transmission slot.

7 Claims, 7 Drawing Sheets

FOREIGN PATENT DOCUMENTS

| | | |
|---|---|---|
| EP | 0 897 233 A3 | 2/1999 |
| EP | 1 039 655 A2 | 9/2000 |
| EP | 1 187 504 A2 | 3/2002 |
| EP | 1 220 499 A2 | 7/2002 |
| JP | 8-237726 A | 9/1996 |
| KR | 2000-0050732 A | 8/2000 |

OTHER PUBLICATIONS

S. Choi, et al., "Transmitter Power Control (TPC) and Dynamic Frequency Selection (DFS) Joint Proposal for 802.11h WLAN", IEEE 802.11-01/169, XX, XX, Mar. 12, 2001, pp. 1-16, XP002213584.

EP Abstract No. 0716514, dated Jun. 12, 1996.

* cited by examiner

WIRELESS COMMUNICATION METHOD FOR AVOIDING MUTUAL INTERFERENCE BETWEEN WIRELESS COMMUNICATION SYSTEMS, AND APPARATUS THEREOF

BACKGROUND OF THE INVENTION

1. Field of the Invention

The present invention relates to a method and apparatus for avoiding mutual interference between wireless communication systems, and more particularly, to an improved method and apparatus for avoiding mutual interference between wireless communication systems by deciding data transmission according to a state of a communication channel. The present application is based on Korean Application No. 2001-26019, filed on May 12, 2001, which is incorporated herein by reference.

2. Description of the Related Art

Figure 1:
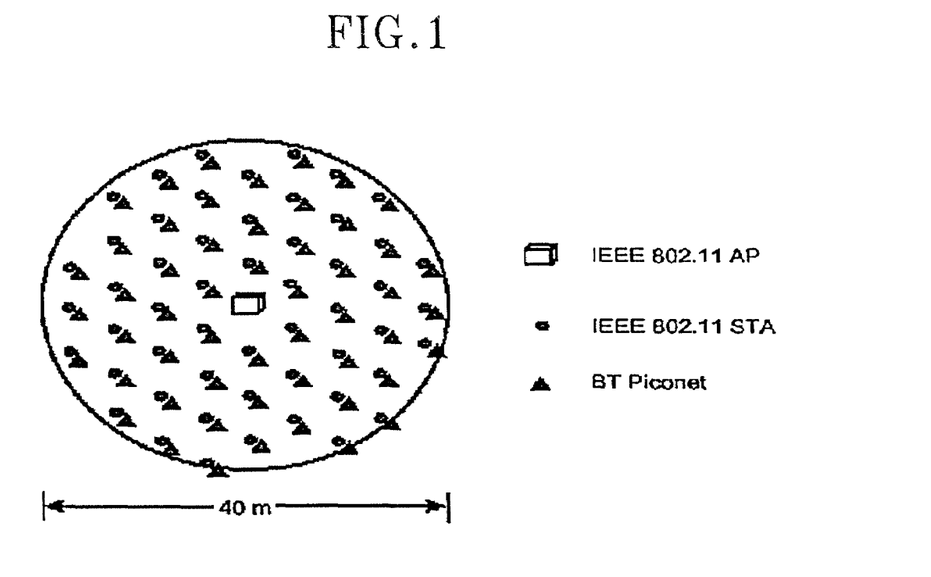
FIG. 1 is a structure diagram illustrating a network where a variety of systems coexist in an identical frequency band.

Recently, a wireless data communication system is designed to exclusively use a certain frequency band. That is to say, it is not considered that a variety of systems using an identical frequency band coexist in some environments at the same time, as shown in FIG. 1. However, in the case of a frequency band usable without permission of the government, various systems can coexist in the identical frequency band. For example, a wireless LAN, Bluetooth, home RF, medical instrument and microwave oven coexist in an industrial scientific medical (ISM) band of 2.4 GHz. Since a plurality of systems coexist in a restricted frequency band, transmission/reception modulation frequencies are inevitably overlapped.

In the case that the modulation frequencies are overlapped, the systems cannot normally perform communication due to mutual interference, and performance thereof is deteriorated. One system recognizes the signals from the other systems using the identical frequency band as noise due to the mutual interference, and thus cannot normally perform the communication.

Figure 2:
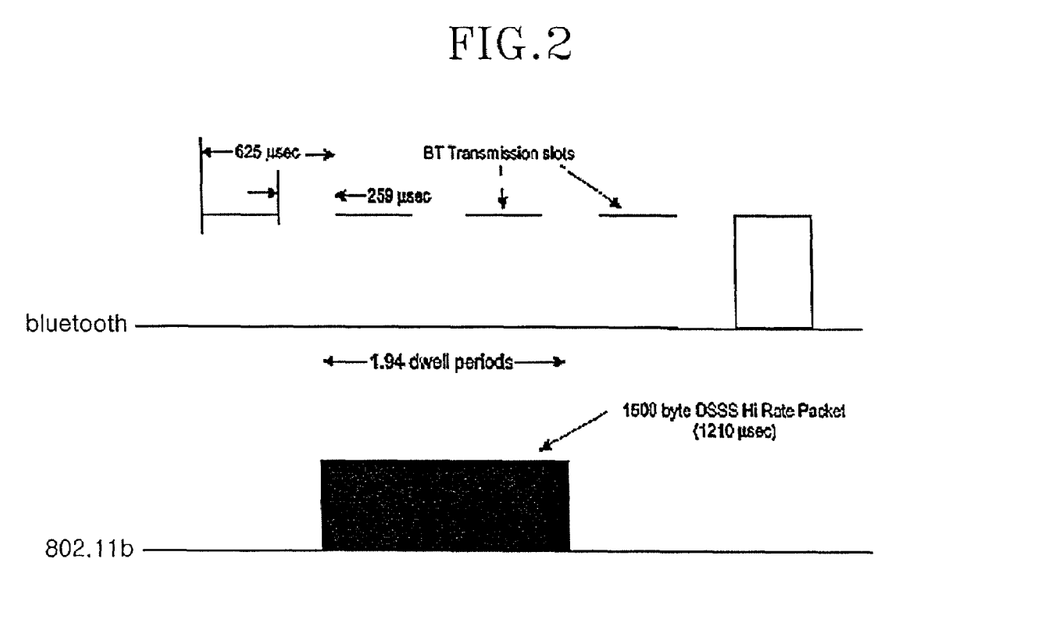
FIG. 2 shows mutual interference between an IEEE 802.11b network (wireless LAN) and a Bluetooth system which both use the identical frequency of 2.4 GHz band.

FIG. 2 shows mutual interference between an IEEE 802.11b network (hereinafter, referred to as "wireless LAN") and a Bluetooth system which both use the identical frequency of 2.4 GHz band. Referring to FIG. 2, one high rate wireless LAN data packet modulated in a direct sequence spread spectrum (DSSS) of 1500 bytes collides with two Bluetooth data slots. Accordingly, the packet colliding with the data of a different system is difficult to be normally demodulated in a reception terminal. Likewise, the data of the system is rarely normally demodulated.

Figure 3:
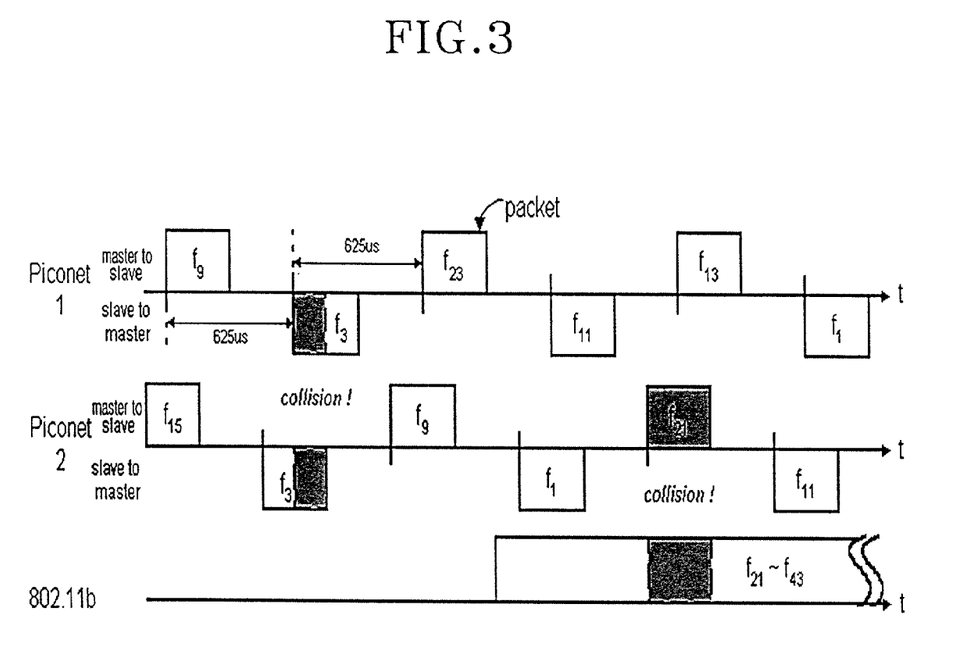
FIG. 3 shows mutual interference between a wireless LAN system and Bluetooth systems composing a multi-Piconet, wherein each system uses an identical frequency of 2.4 GHz band.

FIG. 3 shows mutual interference between the wireless LAN system and the Bluetooth systems composing a multi-Piconet, each system employing the identical frequency of 2.4 GHz band. As shown therein, a collision takes place in a frequency $f_3$ due to interference between Bluetooth multi-Piconets and in a frequency $f_{21}$ due to interference between a Bluetooth system and the wireless LAN system.

Figure 4:
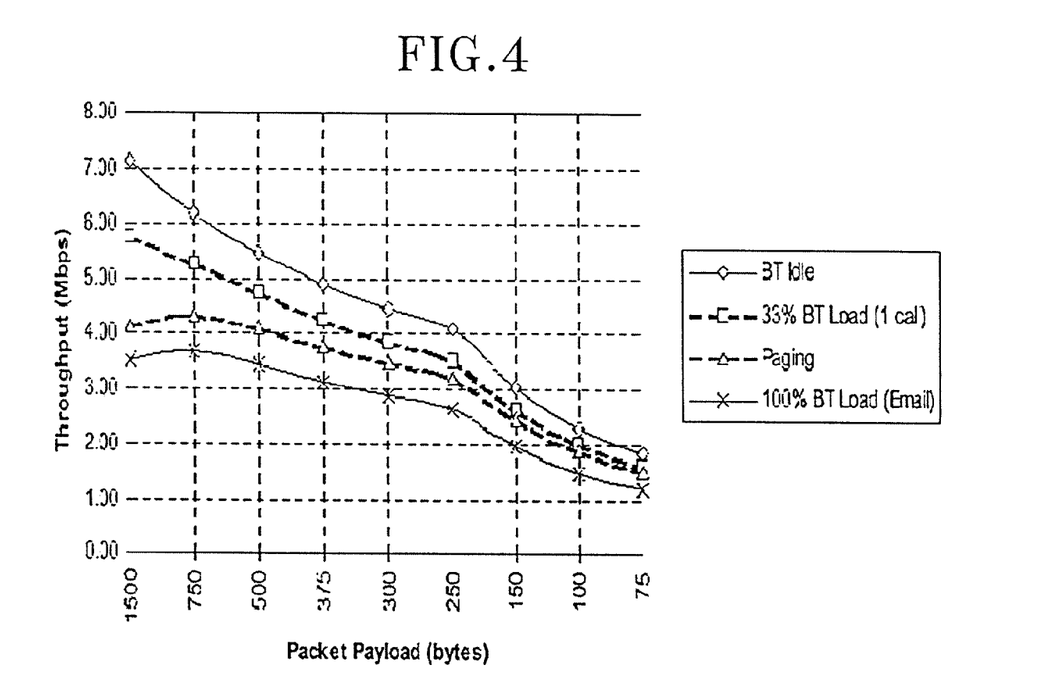
FIG. 4 shows variations of a data throughput of a wireless LAN system in a state where the wireless LAN system and the Bluetooth system coexist.

FIG. 4 shows variations of a data throughput of the wireless LAN system in a state where the wireless LAN system and the Bluetooth system coexist, which has been disclosed in a treatise by Jim Zyren (Bluetooth '99, June 1999). In the case that a packet payload is 1500 bytes in the wireless LAN system, when the Bluetooth system is not operated, namely the wireless LAN system merely exists, the throughput is over 7 Mbps. However, when the Bluetooth terminal has a load of 100% to transmit an E-mail, the throughput of the wireless LAN system is reduced by half, to about 3.5 Mbps.

Therefore, there are increasing demands for a method for avoiding interference and data collision in the communication system. For this, a variety of methods have been suggested.

The wireless LAN system currently uses a carrier sense multiple access with collision avoidance (CSMA/CA) to avoid data collision. A transmission terminal transmits a transmission intention signal before transmitting data, and transmits the data when receiving a response from a reception terminal, thereby avoiding collision with data from a different transmission terminal. However, the CSMA/CA serves to prevent data collision in a single system, and thus is not suitable to avoid collision between different systems.

The CSMA/CA always transmits a collision confirmation signal before data transmission in order to avoid a transmission collision between the terminals. Consequently, network traffic is increased due to the transmission intention signal, thus reducing network speed. In addition, when a terminal which is not sensed by the transmission terminal transmits/receives data to/from the reception terminal, the transmission terminal consecutively transmits the transmission intention signal, which results in reduced performance of the CSMA/CA.

Figure 5:
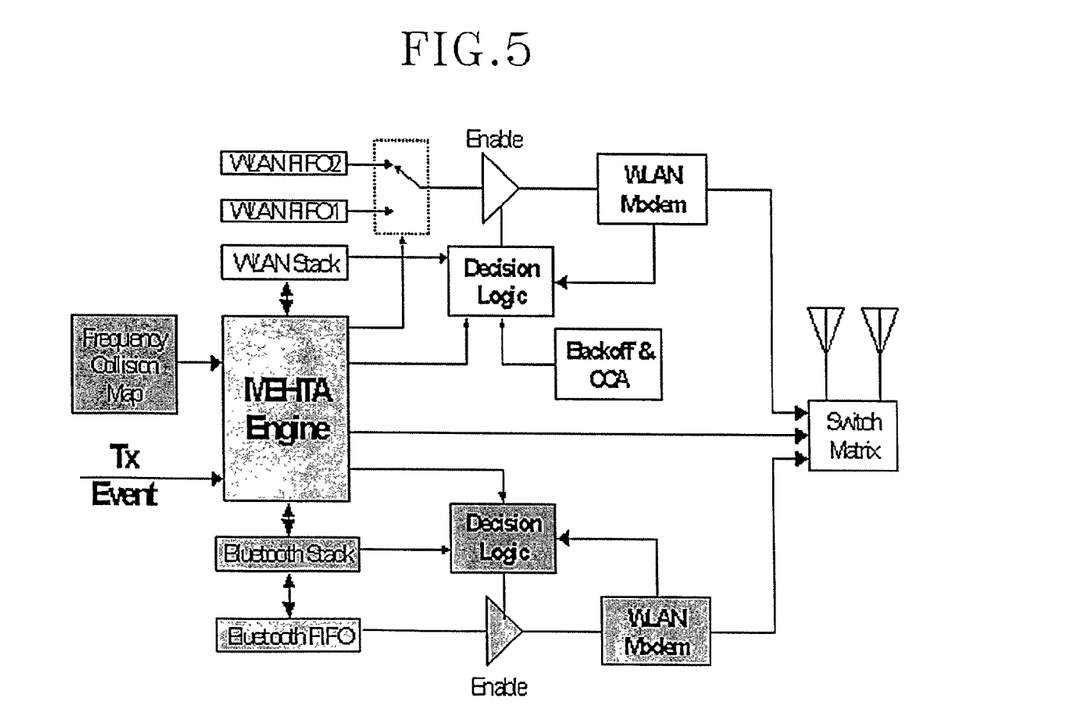
FIG. 5 is a block diagram illustrating a MEHTA engine.

To solve the foregoing problems, the Mobilian corporation has taught a method for monitoring and controlling data transmission of a wireless LAN system and a Bluetooth system by using a MAC Enhanced Temporal Algorithm (MEHTA) engine, as shown in FIG. 5. When the MEHTA engine is specially installed, interference between an adaptive frequency hopping (AFH) type Bluetooth system and a direct spread type wireless LAN is efficiently prevented. However, the MEHTA engine cannot be applied to interference by a frequency spread type wireless LAN and a different Bluetooth Piconet. Especially, the Bluetooth protocol may be widely utilized for a notebook computer and a wireless telephone, but the MEHTA engine is not applied to interference by the different Bluetooth Piconet.

SUMMARY OF THE INVENTION

Accordingly, it is a primary object of the present invention to provide a wireless communication apparatus and method for avoiding mutual interference between wireless communication systems, without generating additional traffic or requiring a specific module for integratedly managing the systems, when a wireless LAN system and a multiple Bluetooth Piconet system coexist.

In order to achieve the above-described object of the present invention, there is provided an apparatus for avoiding mutual interference between wireless communication systems, including: a measurement unit for measuring a channel state of an allocated transmission slot; a judgment unit for judging data transmission on the basis of the channel state of the transmission slot measured in the measurement unit; and a control unit for outputting a signal for performing a transmission operation of the data according to the judgment of the judgment unit. The data transmission is decided according to the channel state of the transmission slot, and data is transmitted only when the transmission channel is empty, thus avoiding mutual interference with a different wireless terminal.

Preferably, the measurement unit measures the strength of a signal received from a channel to be used in the transmission slot to be allocated. By measuring the strength of the signal received from the channel to be used for the data transmission, mutual interference is efficiently avoided in a data modulation system using frequency hopping.

In addition, there is provided a wireless communication method for avoiding mutual interference between wireless communication systems, including the steps of: (a) measuring a channel state of a transmission slot to be allocated; (b) judging data transmission on the basis of the measurement result of the channel state of the transmission slot; and (c) transmitting data through the allocated transmission slot according to the judgment result of step (b).

According to a preferable aspect of the present invention, step (a) includes the steps of: (a1) varying a channel to be used in the transmission slot; and (a2) measuring the strength of a signal received from the varied channel.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

A wireless communication method for avoiding mutual interference between wireless communication systems, and an apparatus thereof, in accordance with a preferred embodiment of the present invention will now be described in detail with reference to the accompanying drawings.

Figure 6:
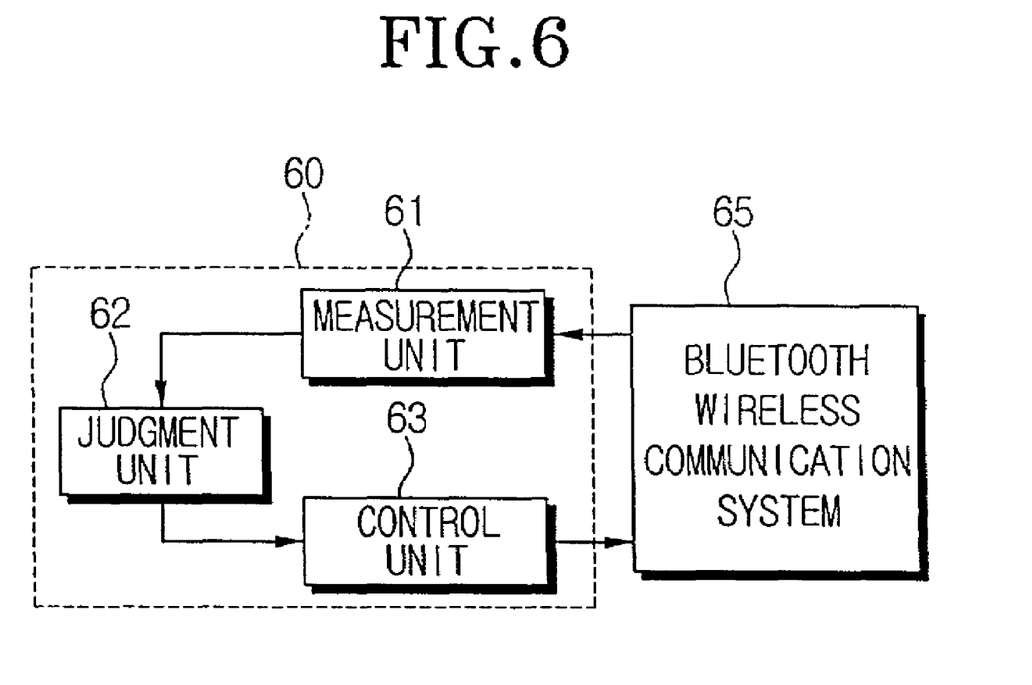
FIG. 6 is a block diagram illustrating an apparatus for avoiding mutual interference between wireless communication systems in accordance with a preferred embodiment of the present invention.
Figure 7:
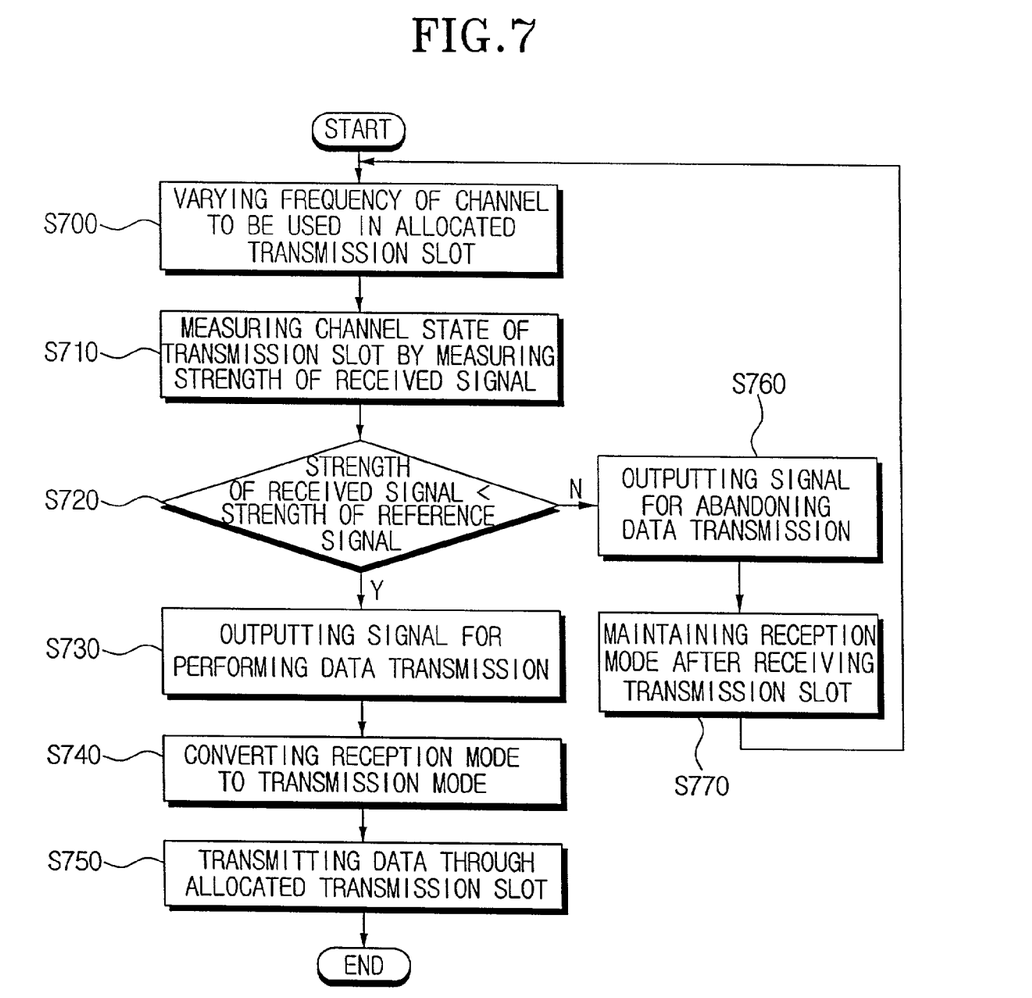
FIG. 7 is a flowchart showing the operation of the apparatus for avoiding mutual interference between wireless communication systems in accordance with the present invention.

FIG. 6 is a block diagram illustrating the apparatus for avoiding mutual interference between wireless communication systems in accordance with the present invention, and FIG. 7 is a flowchart showing the operation of the apparatus for avoiding mutual interference between wireless communication systems in accordance with the present invention. In this embodiment, a Bluetooth terminal is exemplified as the wireless communication system. However, other exemplary wireless communication systems include various wireless communication apparatuses such as a wireless LAN terminal.

Generally, the Bluetooth terminal performs frequency hopping on 79 channels 1600 times per second with an output of 1 mW and a bandwidth of 1 MHz, and modulates a signal according to a Gaussion frequency shift keying (G-FSK). In addition, the Bluetooth terminal employs time division multiple communication. Seven Bluetooth terminals compose one Piconet. Here, one Bluetooth terminal serves as a master for managing the Piconet, such as generation of a frequency hopping pattern, and the other Bluetooth terminals serve as slaves.

Referring to FIGS. 6 and 7, the apparatus 60 for avoiding mutual interference between wireless communication systems, includes: a measurement unit 61 for measuring a channel state of a transmission slot to be allocated; a judgment unit 62 for judging data transmission on the basis of the channel state of the transmission slot measured in the measurement unit 61; and a control unit 63 for outputting a signal for performing a transmission operation of the data according to the judgment of the judgment unit 62.

When a communication path to another Bluetooth terminal composing the Piconet is set up, the transmission slot of the wireless communication system 65 is 625 µs and a transmission time of data is about 360 µs. Accordingly, when the wireless communication system 65 is operated in a reception mode, a standby time of at least 250 µs is given to switch to a transmission mode after receiving data.

Thereafter, when receiving the data from a predetermined transmission slot, the wireless communication system 65 varies a frequency of a transmitter/receiver to a frequency of a channel to be used in the transmission slot to be allocated (S700). That is, the wireless communication system 65 maintains the reception mode for the standby time, and varies the frequency to the frequency of the channel to be used in the transmission slot according to the previously decided frequency hopping pattern.

A signal received through the channel used in the transmission slot for a switching time of the transmission and reception modes (i.e. standby time) is inputted to the measurement unit 61. The measurement unit 61 measures the strength of the received signal, thereby measuring a channel state of the transmission slot to be allocated (S710). A received signal strength indicator (RSSI) may be used as the measurement unit 61.

When the strength of the received signal measured in the measurement unit 61 is inputted, the judgment unit 62 judges data transmission by comparing the strength of the received signal with the strength of a reference signal (S720). When the strength of the received signal is smaller than that of the reference signal, the judgment unit 62 judges that the transmission slot has a good channel state. Preferably, the strength of the reference signal has a value between the strength of a received data signal and the strength of a received noise signal.

The control unit 63 controls the operation of the measurement unit 61 and the judgment unit 62, and outputs a signal for performing the transmission operation of the data according to the judgment of the judgment unit 62. In S720, when the judgment unit 62 judges that the transmission slot has a good channel state, the control unit 63 transmits the signal for performing the transmission operation of the data to the wireless communication system 65 (S730). The wireless communication system 65 converts the reception mode to the transmission mode (S740), and transmits the data through the allocated transmission slot (S750).

In S720, when the strength of the received signal is greater than that of the reference signal, the judgment unit 62 judges that a frequency of the channel of the transmission slot is used by a different system. In this case, the control unit 63 outputs a signal for abandoning the data transmission to the wireless communication system 65 (S760). The wireless communication system 65 maintains the reception mode even after receiving the transmission slot (S770).

On the other hand, when the wireless communication system 65 abandons the data transmission and maintains the reception mode, the procedure of S700 to S720 is preferably repeated on the channel of the transmission slot to be allocated until the transmission slot is deemed to have a good state and the data is transmitted.

Figure 8:
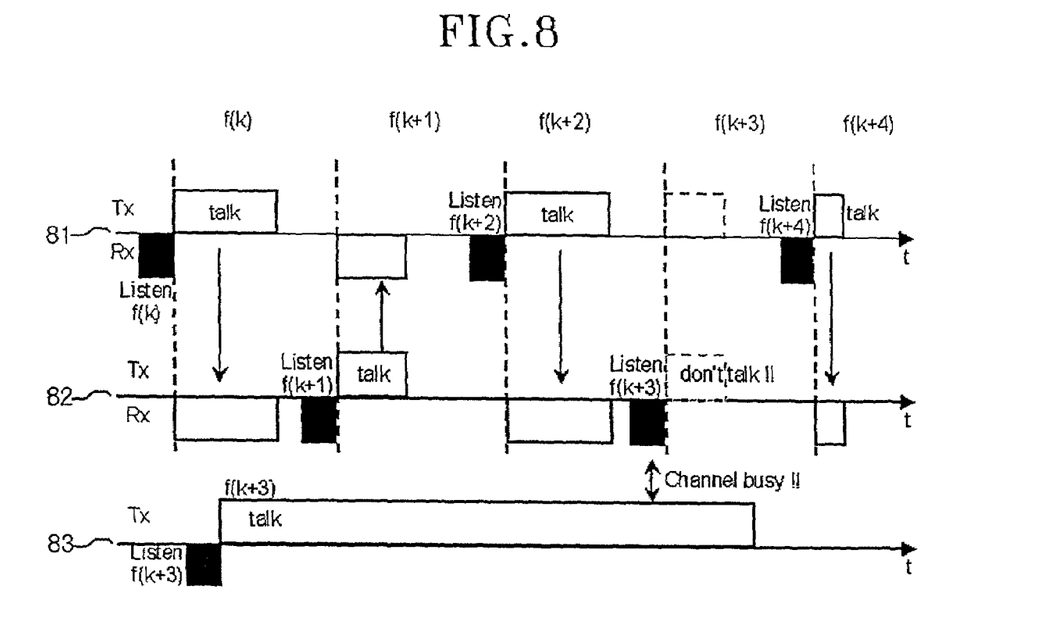
FIG. 8 shows a data transmission state using a method for avoiding mutual interference between wireless communication systems in accordance with the present invention.

FIG. 8 shows a data transmission state using the method for avoiding mutual interference between wireless communication systems in accordance with the present invention. As depicted in FIG. 8, when transmitting data, a master Bluetooth terminal 81, a slave Bluetooth terminal 82 and a wireless LAN terminal 83 confirm a state of a channel used in a transmission slot to be allocated in the reception mode. As a confirmation result, the transmission slot using a frequency of f(k) has a good state, and thus the master Bluetooth terminal 81 transmits the data to the slave Bluetooth terminal 82.

The wireless LAN terminal 83 also confirms a state of a channel before transmitting data. Here, the master Bluetooth terminal 81 transmits data by using the frequency of f(k), and thus a frequency of f(k+3) to be used by the wireless LAN is deemed available. Therefore, the wireless LAN terminal 83 transmits data. However, when the slave Bluetooth terminal 82 intends to transmit data by using the frequency of f (k+3), the wireless LAN terminal 83 already transmits data through the identical frequency band, and thus the slave Bluetooth terminal 82 does not transmit data.

Figure 9A:
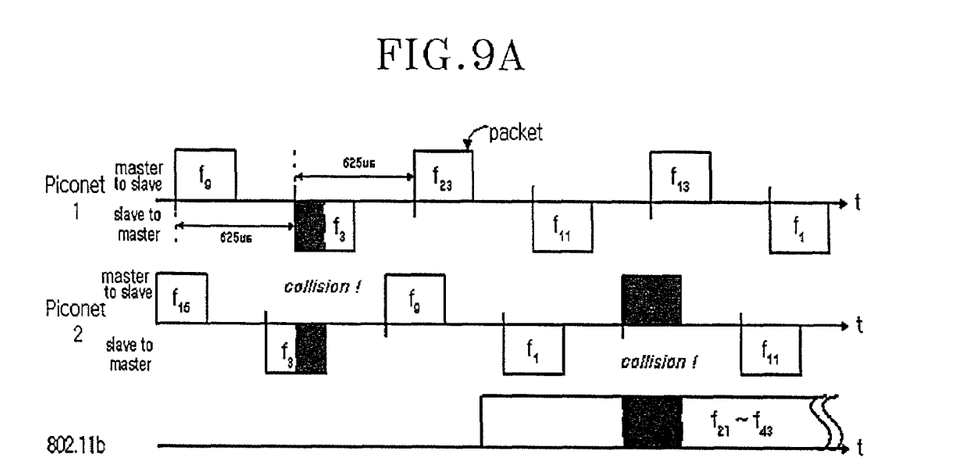
FIGS. 9A and 9B respectively show a data transmission state when the apparatus of the present invention is not used and is used, in a state where two Bluetooth Piconet systems and one wireless LAN system coexist using an identical frequency band.
Figure 9B:
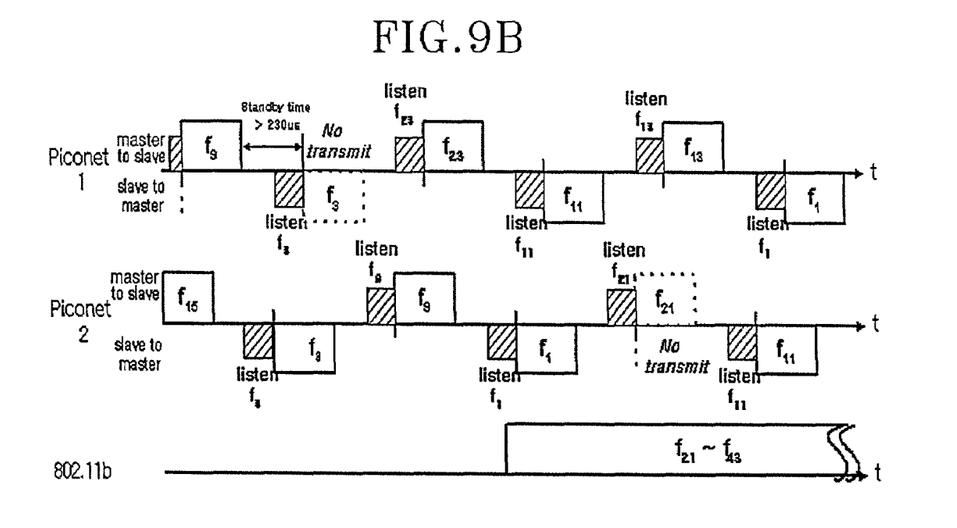

FIGS. 9A and 9B respectively show a data transmission state when the apparatus of the present invention is not used and is used, in a state where two Bluetooth Piconet systems and one wireless LAN system coexist using an identical frequency band. As shown in FIG. 9A, the mutual interference is generated between the Bluetooth Piconet systems and between the Bluetooth Piconet system and the wireless LAN system. Accordingly, when two or more systems use the identical frequency, data of the overlapped region are distorted due to collisions (for example, both Piconet systems using $f_3$ and a Piconet system and the wireless LAN using $f_{21}$) Referring to FIG. 9B, the respective systems confirm a channel state before transmitting data, to avoid data collision.

In accordance with the present invention, the data transmission is decided by confirming the state of the transmission slot, thereby avoiding a collision with a communication apparatus using a frequency identical to the frequency of the channel of the transmission slot. Thus, it is possible to prevent mutual interference between communication systems, without generating additional traffic or requiring a specific traffic control module.

Moreover, a variety of wireless communication systems using the identical frequency band can coexist by applying the present invention to the wireless communication systems including Bluetooth and wireless LAN systems. In addition, the mutual interference between the wireless communication systems can be easily avoided by upgrading existing wireless communication systems.

Although the preferred embodiments of the present invention have been described, it is understood that the present invention should not be limited to these preferred embodiments, and various changes and modifications can be made by one skilled in the art within the spirit and scope of the present invention as hereinafter claimed.

What is claimed is:

1. A wireless communication apparatus configured to avoid mutual interference between wireless communication systems, comprising:
   a measurement unit configured to measure a channel state of a transmission timeslot to be allocated, for a switching time of a reception mode and a transmission mode;
   a judgment unit configured to judge a data transmission on the basis of the channel state of the transmission timeslot measured in the measurement unit; and
   a control unit configured to maintain a reception mode even after receiving data, and to change a frequency of a wireless communication system to a frequency of a channel of a transmission timeslot to be allocated,
   wherein the judgment unit decides the data transmission on basis of the measurement result of the channel state, and re-measures the channel state to re-judge the data transmitted on the basis of the re-measurement result of the channel state, and the control unit outputs a signal for performing a transmission operation of the data according to the judgment of the judgment unit.

2. The apparatus according to claim 1, wherein the measurement unit measures a strength of a signal received from a channel to be used in the transmission timeslot.

3. The apparatus according to claim 1, wherein the judgment unit judges that the channel has a good state when the strength of a received signal is smaller than a strength of a reference signal.

4. A wireless communication method that avoids mutual interference between wireless communication systems, comprising:
   (a) maintaining a reception mode even after receiving data, and changing a frequency of a wireless communication system to a frequency of a channel of a transmission timeslot to be allocated;
   (b) measuring a channel state of the transmission timeslot to be allocated, for a switching time of the reception mode and a transmission mode;
   (c) judging a data transmission on the basis of the measurement result of the channel state of the transmission timeslot from step (b); and
   (d) transmitting data through the transmission timeslot according to the judgment result of step (c);
   wherein the operation (c) comprises: deciding the data transmission on the basis of the measurement result of the channel state and re-measuring the channel state to re-judge the data transmitted on the basis of the remeasurement result of the channel state, and wherein the method further comprises (e) outputting a signal for performing a transmission operation of the data according to the judging operation.

5. The method according to claim 4, wherein the operation (b) comprises the sub-steps of:
   (b1) varying a frequency of a channel to be used in the transmission timeslot; and
   (b2) measuring a strength of a signal received from the varied frequency.

6. The method according to claim 5, wherein step (c) judges whether the channel has a good state, and decides the data transmission when the strength of the received signal is smaller than a strength of a reference signal.

7. A wireless communication method that avoids mutual interference between wireless communication systems, comprising the steps of:

(a) measuring a channel state of a transmission timeslot;

(b) judging a data transmission on the basis of the measurement result of the channel state of the transmission timeslot from step (a); and (c) transmitting data through the transmission timeslot according to the judgment result of step (b), wherein step (a) comprises the sub-steps of:
(a1) varying a frequency of a channel to be used in the transmission timeslot; and
(a2) measuring a strength of a signal received from the varied channel, and wherein, when the strength of the received signal is greater than the strength of a reference signal, abandoning the data transmission using the transmission timeslot, and repeating (a) and (b) on a succeeding transmission timeslot.

* * * * *